(12) United States Patent
Gloceri et al.

(10) Patent No.: US 6,871,866 B2
(45) Date of Patent: Mar. 29, 2005

(54) SUSPENSION SYSTEM FOR A VEHICLE

(75) Inventors: Gary Gloceri, West Bloomfield, MI (US); Joshua D. Coombs, Whitmore Lake, MI (US); Jeremy R. Edmondson, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 232 days.

(21) Appl. No.: 10/340,479

(22) Filed: Jan. 10, 2003

(65) Prior Publication Data

US 2003/0102646 A1 Jun. 5, 2003

Related U.S. Application Data

(63) Continuation-in-part of application No. PCT/US01/48488, filed on Dec. 7, 2001.
(60) Provisional application No. 60/251,951, filed on Dec. 7, 2000.

(51) Int. Cl.$^7$ .............................................. B60G 15/07
(52) U.S. Cl. ..................... 280/124.154; 280/124.157; 280/124.158; 280/124.159
(58) Field of Search ..................... 280/124.1, 124.112, 280/124.157, 124.158, 124.159, 124.154, 124.16

(56) References Cited

U.S. PATENT DOCUMENTS

| | | | | |
|---|---|---|---|---|
| 3,582,106 A | * | 6/1971 | Keijzer ..................... 267/64.19 |
| 3,653,676 A | * | 4/1972 | Higginbotham .......... 280/6.159 |
| 3,717,355 A | | 2/1973 | DeMars |
| 3,885,809 A | | 5/1975 | Pitcher |
| 3,895,816 A | * | 7/1975 | Takahashi et al. ........ 280/5.503 |
| 3,895,820 A | * | 7/1975 | Takahashi et al. ........ 280/6.158 |
| 3,961,336 A | * | 6/1976 | Walker et al. ........... 346/139 C |
| 4,556,718 A | * | 12/1985 | Chastrette et al. .......... 549/449 |
| 4,659,106 A | * | 4/1987 | Fujita et al. .......... 280/124.103 |
| 4,888,696 A | | 12/1989 | Akatsu et al. |
| 5,020,826 A | * | 6/1991 | Stecklein et al. ..... 280/124.159 |
| 5,054,808 A | * | 10/1991 | Tsukamoto ................. 280/5.5 |
| 5,071,157 A | | 12/1991 | Majeed |
| 5,098,119 A | * | 3/1992 | Williams et al. ......... 280/5.507 |
| 5,105,358 A | * | 4/1992 | Takase et al. ................. 701/37 |
| 5,130,926 A | * | 7/1992 | Watanabe et al. ............. 701/37 |
| 5,156,645 A | * | 10/1992 | Tsukamoto et al. ...... 280/5.501 |
| 5,174,598 A | | 12/1992 | Sato et al. |
| 5,208,749 A | | 5/1993 | Adachi et al. |
| 5,217,245 A | | 6/1993 | Guy |
| 5,239,471 A | * | 8/1993 | Takahashi ..................... 701/37 |
| 5,261,455 A | * | 11/1993 | Takahashi et al. ..... 137/625.64 |
| 5,265,913 A | * | 11/1993 | Scheffel ................... 280/6.158 |
| 5,351,790 A | * | 10/1994 | Machida ..................... 188/314 |
| 5,570,287 A | | 10/1996 | Campbell et al. |
| 5,584,498 A | * | 12/1996 | Danek ..................... 280/5.503 |
| 5,593,176 A | | 1/1997 | Campbell et al. |
| 5,632,502 A | | 5/1997 | Oppitz et al. |
| 5,671,142 A | | 9/1997 | Tatarazako |
| 6,259,982 B1 | | 7/2001 | Williams et al. |
| 6,267,387 B1 | | 7/2001 | Weiss |
| 6,318,737 B1 | | 11/2001 | Marechal et al. |
| 6,328,125 B1 | * | 12/2001 | Van Den Brink et al. .. 180/211 |
| 6,361,033 B1 | | 3/2002 | Jones et al. |
| 6,397,134 B1 | | 5/2002 | Shal et al. |

* cited by examiner

Primary Examiner—Paul N. Dickson
Assistant Examiner—Toan To
(74) Attorney, Agent, or Firm—Brinks Hofer Gilson & Lione (57) ABSTRACT

Suspension system for a vehicle is disclosed and claimed. The suspension system includes a compressible fluid, a suspension strut, a hydraulic cavity, a reservoir, and a volume modulator. The hydraulic cavity is at least partially defined by the suspension strut and is adapted to contain a portion of the compressible fluid. The hydraulic cavity and the compressible fluid supply a suspending spring force that biases a wheel of a vehicle toward the road surface. The volume modulator selectively pushes the compressible fluid into the hydraulic cavity and vents the compressible fluid from the hydraulic cavity, thereby modulating the suspending spring force.

20 Claims, 6 Drawing Sheets

SUSPENSION SYSTEM FOR A VEHICLE

CROSS-REFERENCE TO RELATED APPLICATIONS

The present invention is a continuation-in-part of International Application No. PCT/US01/48488, filed 07 Dec. 2001 and entitled "Suspension System For A Vehicle", which claims benefit of U.S. provisional application Ser. No. 60/251,951, filed Dec. 7, 2000 and entitled "Compressible Fluid Strut".

TECHNICAL FIELD

The subject matter of this invention generally relates to suspension systems for a vehicle and, more particularly, to suspension systems including a compressible fluid.

BACKGROUND

In the typical vehicle, a combination of a coil spring and a gas strut function to allow compression movement of a wheel toward the vehicle and rebound movement of the wheel toward the ground. The suspension struts attempt to provide isolation of the vehicle from the roughness of the road and resistance to the roll of the vehicle during a turn. More specifically, the typical coil spring provides a suspending spring force that biases the wheel toward the ground and the typical gas strut provides a damping force that dampens both the suspending spring force and any impact force imparted by the road. Inherent in every conventional suspension strut is a compromise between ride (the ability to isolate the vehicle from the road surface) and handling (the ability to resist roll of the vehicle). Vehicles are typically engineered for maximum road isolation (found in the luxury market) or for maximum roll resistance (found in the sport car market). There is a need, however, for an improved suspension system that avoids this inherent compromise.

DETAILED DESCRIPTION OF THE PREFERRED EMBODIMENTS

The following description of the preferred embodiments of the invention is not intended to limit the invention to these preferred embodiments, but rather to enable any person skilled in the art of suspension systems to use this invention.

Figure 1:
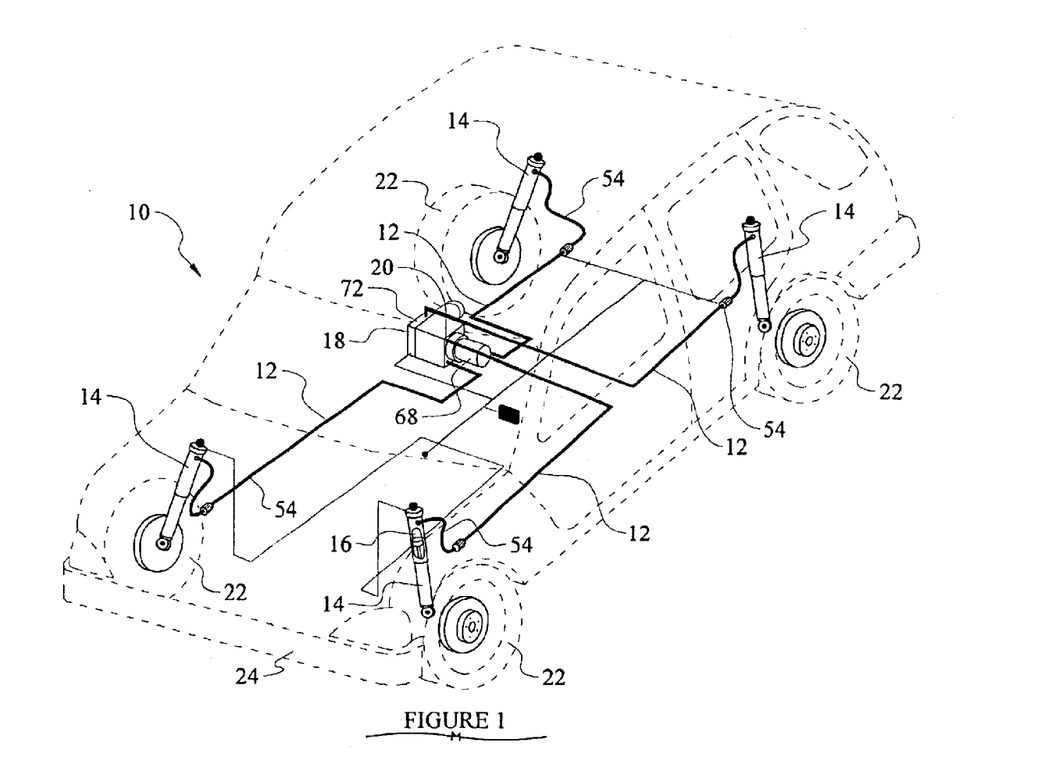
FIG. 1 is a cut away perspective view of the suspension system of the first embodiment, shown within a vehicle.

As shown in FIG. 1, the suspension system 10 of the first embodiment includes a compressible fluid 12, a suspension strut 14, a hydraulic cavity 16, a reservoir 18, and a volume modulator 20. The hydraulic cavity 16, which is at least partially defined by the suspension strut 14, contains a portion of the compressible fluid 12 and cooperates with the compressible fluid 12 to supply a suspending spring force. The suspending spring force biases a wheel 22 of the vehicle 24 toward the surface. The volume modulator 20, which is coupled to the hydraulic cavity 16 and to the reservoir 18, selectively pushes the compressible fluid 12 from the reservoir 18 into the hydraulic cavity 16 and vents the compressible fluid 12 from the hydraulic cavity 16 into the reservoir 18, thereby actively modulating the suspending spring force. By increasing the suspending spring force in the suspension struts 14 of the outside wheels during a turn, the vehicle 24 can better resist roll. By decreasing the suspending spring force over rough surfaces, the vehicle 24 can better isolate the passengers. Thus, by actively modulating the suspending spring force, the vehicle 24 can maximize both ride and handling and avoid the inherent compromise of conventional suspension systems.

Figure 2:
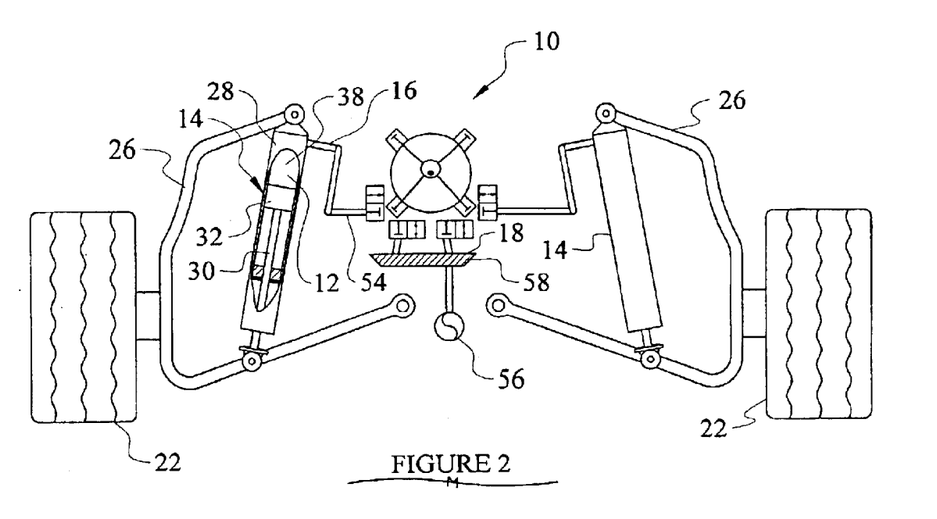
FIG. 2 is a schematic view of the suspension system of FIG. 1.

As shown in FIGS. 1 and 2, the suspension system 10 of the first embodiment has been specifically designed for a vehicle 24 having four wheels 22 and four suspension links 26 (two shown in FIG. 2) suspending the individual wheels 22 from the vehicle 24. The suspension links 26 allow compression movement of the individual wheels 22 toward the vehicle 24 and rebound movement of the individual wheels toward the road surface. Despite this design for a particular environment, the suspension system 10 may be used in any suitable environment, such as other vehicles with more or less wheels.

The compressible fluid 12 of the first embodiment, which cooperates to supply the suspending spring force, is preferably a silicon fluid that compresses about 1.5% volume at 2,000 psi, about 3% volume at 5,000 psi, and about 6% volume at 10,000 psi. Above 2,000 psi, the compressible fluid has a larger compressibility than conventional hydraulic oil. The compressible fluid, however, may alternatively be any suitable fluid, with or without a silicon component, that provides a larger compressibility above 2,000 psi than conventional hydraulic oil.

Figure 3:
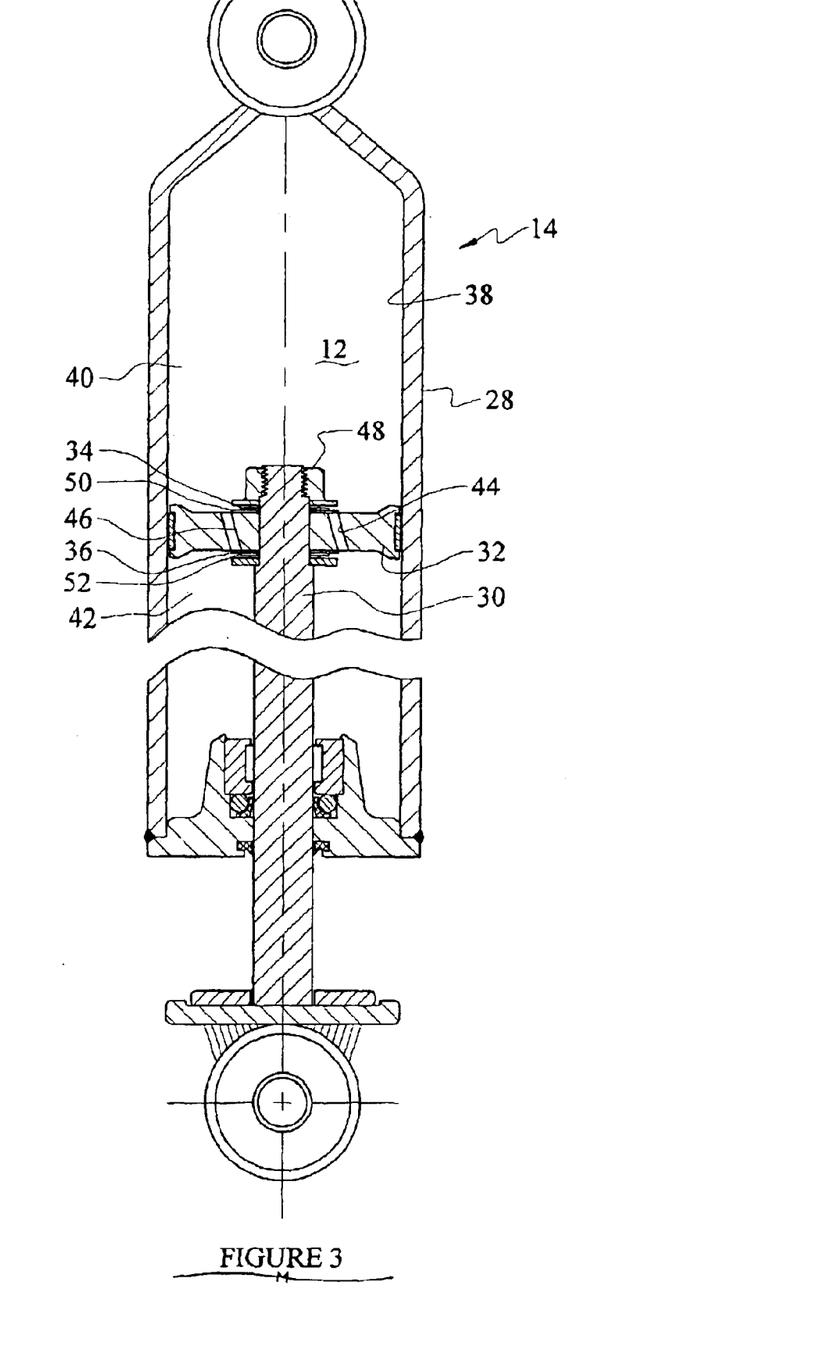
FIG. 3 is a cross-sectional view of a suspension strut of the suspension system of FIG. 1.

As shown in FIGS. 2 and 3, the suspension strut 14 of the first embodiment includes a hydraulic tube 28, a displacement rod 30, a cavity piston 32, a first variable restrictor 34, and a second variable restrictor 36. The hydraulic tube 28 and displacement rod 30 of the first embodiment cooperatively function to couple the suspension link and the vehicle and to allow compression movement of the wheel 22 toward the vehicle and rebound movement of the wheel 22 toward the road surface. The hydraulic tube 28 preferably defines an inner cavity 38, which functions to contain a portion of the compressible fluid 12. As previously mentioned, the inner cavity 38 and the compressible fluid 12 preferably cooperate to supply the suspending spring force that biases the wheel 22 toward the surface and, essentially, suspend the entire vehicle above the surface. The displacement rod 30 is adapted to move into the inner cavity 38 upon the compression movement of the wheel 22 and to move out of the inner cavity 38 upon the rebound movement of the wheel 22. As it moves into the inner cavity 38, the displacement rod 30 displaces, and thereby compresses, the compressible fluid 12. In this manner, the movement of the displacement rod 30 into the inner cavity 38 increases the suspending spring force of the suspension strut 14. As the displacement rod 30 moves out of the inner cavity 38, the compressible fluid 12 decompresses and the suspending spring force of the suspension strut 14 decreases. The displacement rod 30 is preferably cylindrically shaped and, because of this preference, the displacement of the displacement rod 30 within the inner cavity 38 and the magnitude of the suspending spring force have a linear relationship. If a linear relationship is not preferred for the particular application of the suspension strut 14, or if there is any other appropriate reason, the displacement rod 30 may be alternatively designed with another suitable shape. The hydraulic tube 28 and the displacement rod 30 are preferably made from conventional steel and with conventional methods, but may alternatively be made from any suitable material and with any suitable method.

The cavity piston 32 of the first embodiment is preferably coupled to the displacement rod 30 and preferably extends to the hydraulic tube 28. In this manner, the cavity piston 32 separates the inner cavity 38 into a first section 40 and a second section 42. The cavity piston 32 defines a first orifice 44 and a second orifice 46, which both preferably extend between the first section 40 and the second section 42 of the inner cavity 38. The first orifice 44 and the second orifice 46 function to allow flow of the compressible fluid 12 between the first section 40 and the second section 42 of the inner cavity 38. The cavity piston 32 is preferably securely mounted to the displacement rod 30 by a conventional fastener 48, but may alternatively be integrally formed with the displacement rod 30 or securely mounted with any suitable device. The cavity piston 32 is preferably made from conventional materials and with conventional methods, but may alternatively be made from other suitable materials and with other suitable methods.

The first variable restrictor 34 of the first embodiment is coupled to the cavity piston 32 near the first orifice 44. The first variable restrictor 34 functions to restrict the passage of the compressible fluid 12 through the first orifice 44 and, more specifically, functions to variably restrict the passage based on the velocity of the cavity piston 32 relative to the hydraulic tube 28. In the first first embodiment, the first variable restrictor 34 is a first shim stack 50 preferably made from conventional materials and with conventional methods. In alternative embodiments, the first variable restrictor 34 may include any other suitable device able to variably restrict the passage of the compressible fluid 12 through the first orifice 44 based on the velocity of the cavity piston 32 relative to the hydraulic tube 28. The second variable restrictor 36 of the first embodiment is coupled to the cavity piston 32 near the second orifice 46. The second variable restrictor 36—like the first variable restrictor 34—functions to restrict the passage of the compressible fluid 12 through the second orifice 46 and, more specifically, functions to variably restrict the passage based on the velocity of the cavity piston 32 relative to the hydraulic tube 28. In the first embodiment, the second variable restrictor 36 is a second shim stack 52 preferably made from conventional materials and with conventional methods. In alternative embodiments, the second variable restrictor 36 may include any suitable device able to variably restrict a passage of the compressible fluid 12 through the second orifice 46 based on the velocity of the cavity piston 32 relative to the hydraulic tube 28.

The cavity piston 32, the first orifice 44, and the first variable restrictor 34 of the first embodiment cooperate to supply the rebound damping force during the rebound movement of the wheel 22. The rebound damping force acts to dampen the suspending spring force that tends to push the displacement rod 30 out of the hydraulic tube 28. The cavity piston 32, the second orifice 46, and a second variable restrictor 36, on the other hand, cooperate to supply the compression damping force during the compression movement of the wheel 22. The compression damping force acts to dampen any impact force that tends to push the displacement rod 30 into the hydraulic tube 28.

The suspension strut 14 of the first embodiment is further described in U.S. application filed on 07 Dec. 2001, entitled "Compressible Fluid Strut", and assigned to Visteon Global Technologies, Inc. As described in that application, the suspension strut may include a pressure vessel and may include a valve. In alternative embodiments, the suspension strut may include any suitable device to allow active modulation of the suspending spring force with compressible fluid.

As shown in FIG. 1, the suspension system 10 of the first embodiment also includes hydraulic lines 54 adapted to communicate the compressible fluid 12 between the individual suspension struts 14 and the volume modulator 20. Together with the inner cavity 38 of the individual suspension struts 14, the hydraulic lines 54 define individual hydraulic cavities 16. Preferably, the compressible fluid 12 flows freely between the volume modulator 20 and the inner cavity 38 of the individual suspension struts 14. Alternatively, the hydraulic cavities 16 may include one or more controllable valves such that the hydraulic cavity 16 is entirely defined by the suspension strut 14 or by the suspension strut 14 and a portion of the hydraulic line 54.

As shown in FIG. 2, the reservoir 18 functions to contain a portion of the compressible fluid 12 that has been vented from the hydraulic cavity 16 and that may eventually be pushed into the hydraulic cavity 16. The reservoir 18 is preferably made from conventional materials and with conventional methods, but may alternatively be made from any suitable material and with any suitable method. The suspension system 10 of the first embodiment includes a pump 56 adapted to pressurize the compressible fluid 12 within the reservoir 18. In this manner, the reservoir 18 acts as an accumulator 58. By using compressible fluid 12 under a pressure of about 1500 psi within the reservoir 18, the volume modulator 20 consumes less energy to reach a particular pressure within an individual hydraulic cavity 16. In an alternative embodiment, the compressible fluid 12 within the reservoir 18 may be at atmospheric pressure or may be vented to the atmosphere.

As shown in FIG. 2, the volume modulator 20 is coupled to the hydraulic line 54 and to the reservoir 18. The volume modulator 20, as previously mentioned, functions to selectively push the compressible fluid 12 into the hydraulic cavity 16 and to vent the compressible fluid 12 from the hydraulic cavity 16. In the first embodiment, the volume modulator 20 is a digital displacement pump/motor as described in U.S. Pat. No. 5,259,738 entitled "Fluid-Working Machine" and issued to Salter et al. on 09 Nov. 1993, which is incorporated in its entirety by this reference. In alternative embodiments, the volume modulator 20 may be any suitable device that selectively pushes the compressible fluid 12 into the hydraulic cavity 16 and vents the compressible fluid 12 from the hydraulic cavity 16 at a sufficient rate to actively modulate the suspending spring force.

Figure 4:
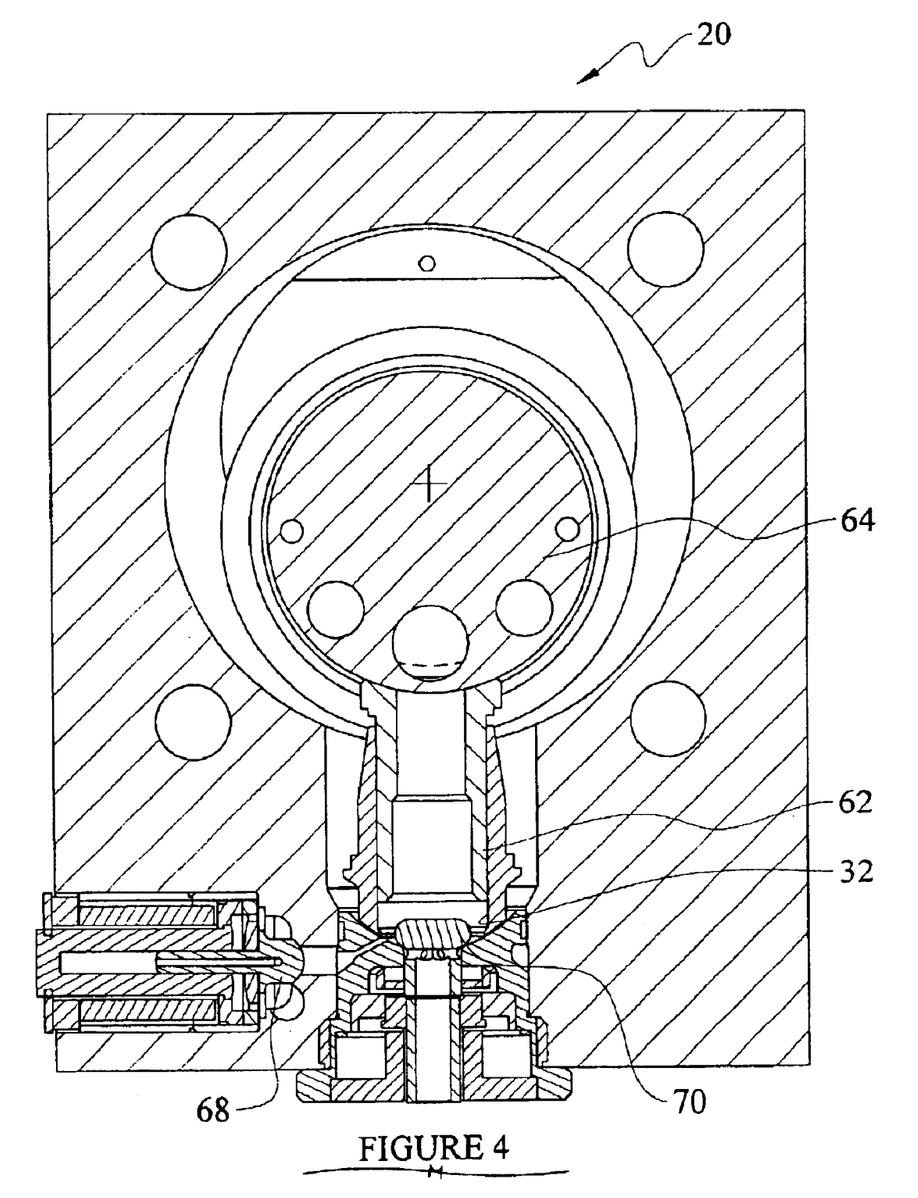
FIG. 4 is a detailed view of the volume modulator of the suspension system of FIG. 1.

As shown in FIG. 4, the volume modulator 20 of the first embodiment defines a modulator cavity 60 and includes a modulator piston 62 adapted to continuously cycle through a compression stroke and an expansion stroke within the modulator cavity 60. The modulator piston 62 is preferably connected to an eccentric 64 that is rotated by a motor 66 (shown in FIG. 1). Because of the "active" nature of the modulation of the suspending spring force, the modulator piston 62 cycles through the compression stroke and expansion stroke at a relatively high frequency (up to 30 Hz) and, thus, the motor preferably rotates at a relatively high rotational velocity (up to 2000 rpm).

The volume modulator 20 of the first embodiment also includes a cavity-side valve 68 coupled between the hydraulic line and the volume modulator 20 and a reservoir-side valve 70 coupled between the reservoir and the volume modulator 20. The cavity-side valve 68 and the reservoir-side valve 70 function to selectively restrict the passage of the compressible fluid. Preferably, the cavity-side valve 68 and the reservoir-side valve 70 are so-called poppet valves that may be actuated at relatively high frequencies. Alternatively, the cavity-side valve 68 and the reservoir-side valve 70 may be any suitable device that selectively restricts the passage of the compressible fluid at an adequate frequency.

Figure 5A:
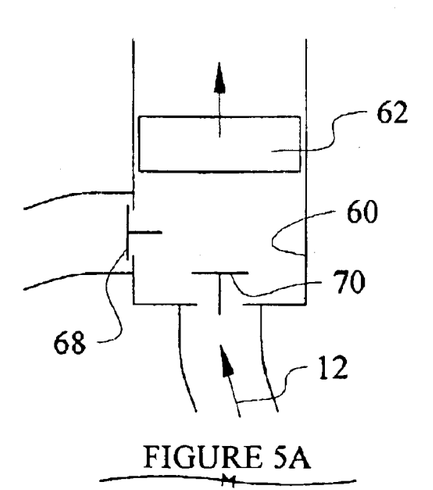
FIGS. 5A, 5B, 6A, and 6B are schematic views of the different stages of the volume modulator of FIG. 4.
Figure 5B:
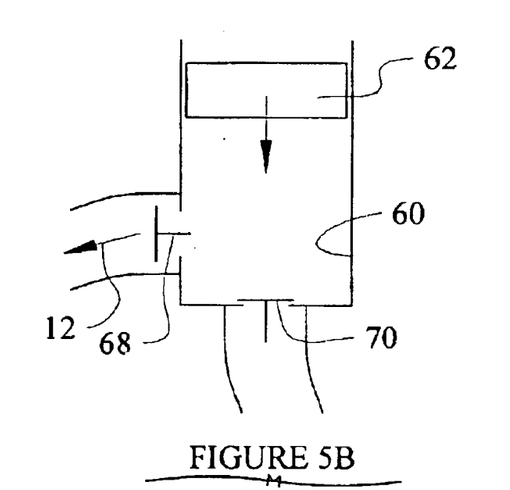

As shown in FIGS. 5A and 5B, the cavity-side valve 68, the reservoir-side valve 70, and the modulator piston 62 can cooperate to draw compressible fluid 12 from the reservoir and push the compressible fluid 12 into the hydraulic cavity. In the first stage, as shown in FIG. 5A, the cavity-side valve 68 is closed and the reservoir-side valve 70 is opened, while the modulator piston 62 increases the volume in the modulator cavity 60 (the expansion stroke). The expansion stroke of the modulator piston 62 draws the compressible fluid 12 into the modulator cavity 60. During the second stage, as shown in FIG. 5B, the reservoir-side valve 70 is closed and the cavity-side valve 68 is opened, while the modulator piston 62 decreases the volume in the modulator cavity 60 (the compression stroke). The compression stroke of the modulator piston 62 pushes the compressible fluid 12 into the hydraulic cavity, which increases the suspending spring force at that particular suspension strut and wheel.

Figure 6A:
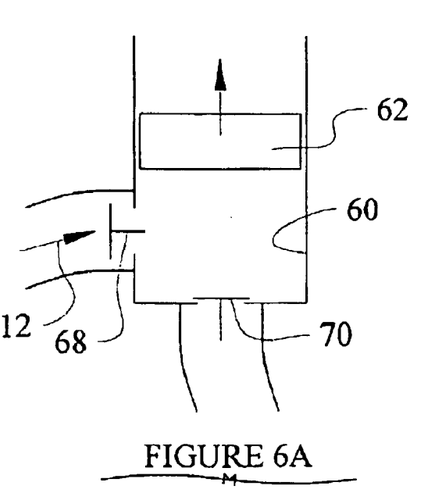
Figure 6B:
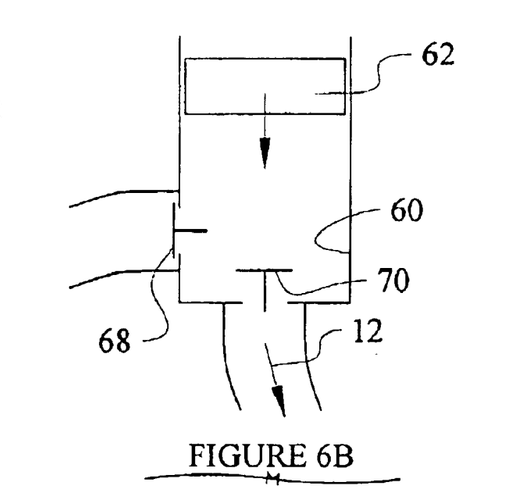

As shown in FIGS. 6A and 6B, the cavity-side valve 68, the reservoir-side valve 70, and the modulator piston 62 can also cooperate to draw compressible fluid 12 from the hydraulic cavity and vent the compressible fluid 12 into the reservoir. In the first stage, as shown in FIG. 6A, the cavity-side valve 68 is opened and the reservoir-side valve 70 is closed, while the modulator piston 62 increases the volume in the modulator cavity 60 and draws the compressible fluid 12 into the modulator cavity 60. During the second stage, as shown in FIG. 6B, the reservoir-side valve 70 is opened and the cavity-side valve 68 is closed, while the modulator piston 62 decreases the volume in the modulator cavity 60 and vents the compressible fluid 12 into the reservoir, which decreases the suspending spring force at that particular suspension strut and wheel.

During the operation of the vehicle, it may be advantageous to neither increase nor decrease the suspending spring force. Since the motor 66, the eccentric 64, and the modulator pistons 62 are continuously moving, the reservoir-side valve 70 and the volume modulator 20 can also cooperate to draw compressible fluid 12 from the reservoir (shown in FIG. 5A) and vent the compressible fluid 12 back into the reservoir (shown in FIG. 6B). This process does not modulate the pressure of the hydraulic cavity 16 and does not increase or decrease the suspending spring force.

Although FIGS. 5A, 5B, 6A, and 6B show only one modulator cavity 60 and modulator piston 62, the volume modulator 20 preferably includes a modulator cavity 60, a modulator piston 62, a cavity-side valve 68, and a reservoir-side valve 70 for each suspension strut 14 on the vehicle 24. Preferably, the motor 66 and the eccentric 64 drive the multiple modulator pistons 62, but the individual modulator pistons 62 may alternatively be driven by individual motors and individual eccentrics. Further, a control unit 72 (shown in FIG. 1) may individually control the cavity-side valve 68 and reservoir-side valve 70 corresponding to a particular suspension strut 14 and wheel 22 to adjust the ride and handling of the vehicle 24 on a wheel-to-wheel basis. The control unit 72 may also be used to adjust particular suspension struts 14 on a side-by-side basis of the vehicle 24 to adjust the roll or the pitch of the vehicle 24. The control unit 72 may further be used to adjust all of the suspension struts 14 to adjust the ride height of the vehicle 24. The control unit 72 is preferably made from conventional material and with conventional methods, but may alternatively be made from any suitable material and with any suitable method.

Figure 7:
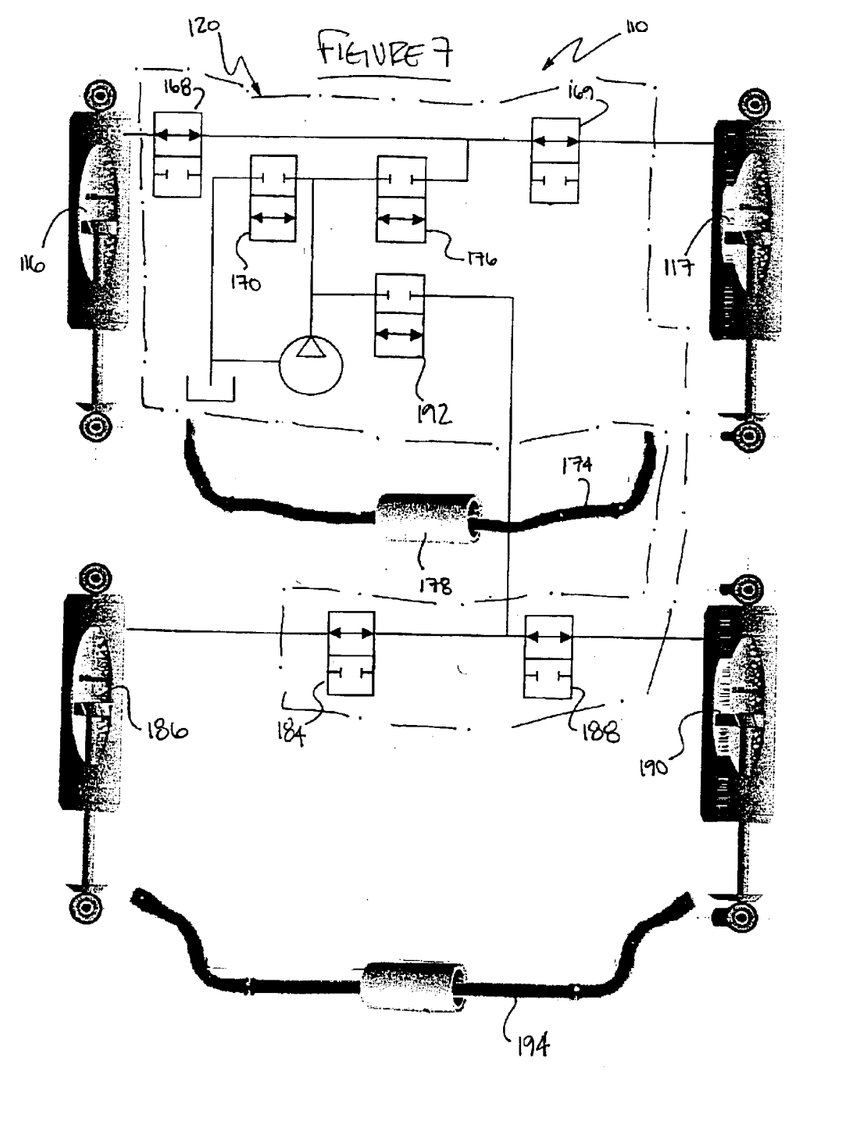
FIG. 7 is a schematic view of the suspension system of the second embodiment.

As shown in FIG. 7, the suspension system 110 of the second embodiment is preferably similar to the suspension system 110 of the first embodiment, except for the modifications to the volume modulator 120 and the control unit and the addition of an anti-roll bar 174.

The volume modulator 120 of the second embodiment includes a primary cavity-side valve 176 coupled between the modulator cavity and the first and second cavity-side valves 168 and 169. The primary cavity-side valve 176 functions to selectively restrict the passage of the compressible fluid. Preferably, the first cavity-side valve 168, the second cavity-side valve 169, and the primary cavity-side valve 176 are traditional valves that may be actuated at relatively low frequencies. Unlike the suspension system 10 of the first embodiment, the suspension system 110 of the second embodiment optimally operates at low frequencies. While slower than the suspension system 10 of the first embodiment, the suspension system 110 of the second embodiment reduces the complexity, the cost, and the energy consumption compared to the suspension system 10 of the first embodiment. The primary cavity-side valve 176 provides the capabilities to allow height adjustment in the suspension system 110 of the second embodiment, while avoiding the high frequency difficulties of the suspension system 10 of the first embodiment.

To increase the height of the vehicle, the control unit of the second embodiment opens the primary cavity-side valve 176, the first cavity-side valve 168, and the second cavity-side valve 169, and closes the reservoir-side valve 170 to push the compressible fluid into the first and second hydraulic cavities 116 and 117. Further, to decrease the height of the vehicle, the control unit opens the primary cavity-side valve 176, the first cavity-side valve 168, the second cavity-side valve 169, and the reservoir-side valve 170 to vent the compressible fluid from the first and second hydraulic cavities 116 and 117. The pushing or venting of the compressible fluid into the first and second hydraulic cavities 116 and 117 functions to increase or decrease the distance between the first and second wheels and the vehicle (e.g., to increase or decrease the ride height of the vehicle).

In alternative embodiments, the control unit may be adapted to control the volume modulator based on the temperature of the compressible fluid. This function could be implemented to substantially negate the temperature effects on the suspension system 110. In further alternative embodiments, the control unit may be adapted to control the volume modulator 120 based on an input from an operator of the vehicle or based on an input from a road sensor. These functions could be implemented in a vehicle to allow height adjustment from a drag reducing low position to a ground clearing high position.

The anti-roll bar 174 of the suspension system 110 of the second embodiment is coupled to the first and second suspension links (not shown). The anti-roll bar 174, like a traditional anti-roll bar 174, functions to reduce the roll of the vehicle. The anti-roll bar 174, however, also includes a disconnect portion 178, which functions to selectively disconnect opposing portions 180 and 182 of the anti-roll bar 174. The control unit, which is connected to the anti-roll bar 174, is adapted to selectively connect and restrict movement of the first and second suspension links during a turning maneuver at high speeds to reduce roll of the vehicle, and adapted to selectively disconnect and allow movement of the first and second suspension links during low speeds to improve ride of the vehicle.

To further reduce roll of the vehicle during a turning maneuver at high speeds, the control unit of the second embodiment can close the first cavity-side valve 168 and the second cavity-side valve 169 to prevent fluid communication between the first and second hydraulic cavities 116 and 117. Additionally, to further improve ride of the vehicle during low speeds, the control unit can close the primary cavity-side valve 176 and opens the first cavity-side valve 168 and the second cavity-side valve 169 to allow fluid communication between the first and second hydraulic cavities 116 and 117. By preventing fluid communication, the volume of the hydraulic cavity is reduced, thereby increasing the suspending spring force and reducing the roll of the vehicle. By allowing fluid communication, compressible fluid may be transferred from a relatively high pressurized hydraulic cavity to a relatively low pressurized hydraulic cavity, thereby reducing the overall harshness of the suspension system. In an alternative embodiment, these functions may be used by a suspension system without an anti-roll bar to effect roll reduction and ride improvement.

The suspension system 110 of the second embodiment also includes a third cavity-side valve 184 connected to a third hydraulic cavity 186, a fourth cavity-side valve 188 connected to a fourth hydraulic cavity 190, a second primary cavity-side valve 192, and a second anti-roll bar 194 for the rear wheels of the vehicle. The third cavity-side valve 184, the fourth cavity-side valve 188, and the second primary cavity-side valve 192 are preferably similar to the first cavity-side valve 168, the second cavity-side valve 169, and the primary cavity-side valve 176. Further, the second anti-roll 194 is preferably similar to the anti-roll bar 174.

As any person skilled in the art of suspension systems will recognize from the previous detailed description and from the figures and claims, modifications and changes can be made to the preferred embodiments of the invention without departing from the scope of this invention defined in the following claims.

We claim:

1. A suspension system for a vehicle having first and second wheels contacting a surface under the vehicle and first and second suspension links respectively suspending the first and second wheels from the vehicle and allowing relative movement of the first and second wheels and the vehicle, said suspension system comprising:
    a compressible fluid;
    a first suspension strut adapted to couple the first suspension link and the vehicle;
    a first hydraulic cavity at least partially defined by said first suspension strut and adapted to contain a portion of said compressible fluid and to cooperate with said compressible fluid to supply a first suspending spring force that biases the first wheel toward the surface;
    a second suspension strut adapted to couple the second suspension link and the vehicle;
    a second hydraulic cavity at least partially defined by said second suspension strut and adapted to contain a portion of said compressible fluid and to cooperate with said compressible fluid to supply a second suspending spring force that biases the second wheel toward the surface;
    a reservoir adapted to contain a portion of said compressible fluid;
    a volume modulator coupled to said first and second hydraulic cavities and said reservoir and adapted to selectively push said compressible fluid into said first and second hydraulic cavities and vent said compressible fluid from said first and second hydraulic cavities thereby modulating said first and second suspending spring forces, wherein said volume modulator includes a first cavity-side valve coupled between said first hydraulic cavity and said modulator cavity, a second cavity-side valve coupled between said second hydraulic cavity and said modulator cavity, and a reservoir-side valve coupled between said reservoir and said modulator cavity; and
    a control unit coupled to said volume modulator and adapted to influence said volume modulator to push said compressible fluid into said first and second hydraulic cavities to increase the distance between the first and second wheels and the vehicle.

2. The suspension system of claim 1, wherein said control unit is further adapted to control said volume modulator based on the temperature of said compressible fluid.

3. The suspension system of claim 2, wherein said control unit is further adapted to control said volume modulator based on an input from an operator of the vehicle.

4. The suspension system of claim 3, wherein said control unit is further adapted to control said volume modulator based on an input from a sensor.

5. The suspension system of claim 1, further comprising an anti-roll bar coupled to the first and second suspension links, adapted to selectively connect and restrict movement of the first and second wheels, and adapted to selectively disconnect and allow movement of the first and second wheels.

6. The suspension system of claim 5, wherein said control unit is further adapted to connect said anti-roll bar during a turning maneuver at high speeds to reduce roll of the vehicle.

7. The suspension system of claim 6, wherein said control unit is further adapted to disconnect said anti-roll bar during low speeds to improve ride of the vehicle.

8. The suspension system of claim 7, further comprising a primary cavity-side valve coupled between said modulator cavity and said first and second cavity-side valves.

9. The suspension system of claim 8, wherein said control unit is further adapted to open said primary cavity-side valve, open said first cavity-side valve, open said second cavity-side valve, and close said reservoir-side valve to push said compressible fluid into said first and second hydraulic cavities.

10. The suspension system of claim 9, wherein said control unit is further adapted to open said primary cavity-side valve, open said first cavity-side valve, open said second cavity-side valve, and open said reservoir-side valve to vent said compressible fluid from said first and second hydraulic cavities.

11. The suspension system of claim 10, wherein said control unit is further adapted to close said first cavity-side valve and close said second cavity-side valve during a turning maneuver at high speeds to further reduce roll of the vehicle.

12. The suspension system of claim 10, wherein said control unit is further adapted to close said primary cavity-side valve, open said first cavity-side valve, and open said second cavity-side valve during low speeds to further improve ride of the vehicle.

13. The suspension system of claim 1 wherein said compressible fluid includes a silicone fluid.

14. The suspension system of claim 1 wherein said compressible fluid has a larger compressibility above 2,000 psi than hydraulic oil.

15. The suspension system of claim 1 wherein said compressible fluid is adapted to compress about 1.5% volume at 2,000 psi, about 3% volume at 5,000 psi, and about 6% volume at 10,000 psi.

16. The suspension system of claim 1, further comprising a primary cavity-side valve coupled between said modulator cavity and said first and second cavity-side valves.

17. The suspension system of claim 16, wherein said control unit is further adapted to open said primary cavity-side valve, open said first cavity-side valve, open said second cavity-side valve, and close said reservoir-side valve to push said compressible fluid into said first and second hydraulic cavities.

18. The suspension system of claim 17, wherein said control unit is further adapted to open said primary cavity-side valve, open said first cavity-side valve, open said second cavity-side valve, and open said reservoir-side valve to vent said compressible fluid from said first and second hydraulic cavities.

19. The suspension system of claim 18, wherein said control unit is further adapted to close said first cavity-side valve and close said second cavity-side valve during a turning maneuver at high speeds to reduce roll of the vehicle.

20. The suspension system of claim 18, wherein said control unit is further adapted to close said primary cavity-side valve, open said first cavity-side valve, and open said second cavity-side valve during low speeds to improve ride of the vehicle.

* * * * *